United States Patent
Hong et al.

(10) Patent No.: US 9,474,081 B2
(45) Date of Patent: Oct. 18, 2016

(54) METHOD FOR OBTAINING A TIMING ADVANCE VALUE

(75) Inventors: Wei Hong, Beijing (CN); Haiming Wang, Beijing (CN); Jing Han, Beijing (CN); Na Wei, Beijing (CN); Chunyan Gao, Beijing (CN); Erlin Zeng, Beijing (CN)

(73) Assignee: Broadcom Corporation, Irvine, CA (US)

(*) Notice: Subject to any disclaimer, the term of this patent is extended or adjusted under 35 U.S.C. 154(b) by 16 days.

(21) Appl. No.: 14/234,766

(22) PCT Filed: Jul. 26, 2011

(86) PCT No.: PCT/CN2011/077626
§ 371 (c)(1),
(2), (4) Date: Jan. 27, 2014

(87) PCT Pub. No.: WO2013/013390
PCT Pub. Date: Jan. 31, 2013

(65) Prior Publication Data
US 2014/0148187 A1    May 29, 2014

(51) Int. Cl.
*H04W 24/00* (2009.01)
*H04W 72/00* (2009.01)
*H04W 72/12* (2009.01)
*H04W 56/00* (2009.01)
*H04W 64/00* (2009.01)

(52) U.S. Cl.
CPC ..... *H04W 72/1205* (2013.01); *H04W 56/0005* (2013.01); *H04W 56/006* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 5,479,409 A * | 12/1995 | Dupuy et al. | 370/337 |
| 2002/0122406 A1 * | 9/2002 | Chillariga et al. | 370/347 |
| 2005/0053099 A1 * | 3/2005 | Spear et al. | 370/508 |
| 2008/0075026 A1 * | 3/2008 | Son | H04W 52/0216 370/311 |
| 2010/0074246 A1 * | 3/2010 | Harada | H04W 56/0045 370/350 |
| 2010/0265140 A1 * | 10/2010 | Sohn | 342/451 |
| 2010/0325226 A1 * | 12/2010 | McBeath et al. | 709/206 |
| 2011/0034122 A1 | 2/2011 | Kennedy, Jr. et al. | |
| 2011/0310867 A1 * | 12/2011 | Kennedy et al. | 370/338 |
| 2012/0127964 A1 * | 5/2012 | Turtinen | H04W 56/0045 370/336 |
| 2012/0182986 A1 * | 7/2012 | Sebire | H04W 56/00 370/343 |

FOREIGN PATENT DOCUMENTS

| | | |
|---|---|---|
| CN | 102045839 | 5/2011 |
| WO | 2011020211 | 2/2011 |

* cited by examiner

*Primary Examiner* — Marivelisse Santiago Cordero
*Assistant Examiner* — Moustapha Diaby
(74) *Attorney, Agent, or Firm* — Oblon, McClelland, Maier & Neustadt, L.L.P.

(57) ABSTRACT

Timing control procedure is needed for uplink transmissions in several communication networks. Some networks and bands have physical and regulatory limitations for obtaining timing advance value in conventional manner. One example of these limitations is disabled downlink channel in TV white spaces. The present invention provides an arrangement for obtaining timing advance value in a situation wherein the use of downlink channel is disabled.

16 Claims, 2 Drawing Sheets

METHOD FOR OBTAINING A TIMING ADVANCE VALUE

FIELD OF THE INVENTION

The invention relates generally to mobile communications. In particular, the invention relates to methods, computer programs, apparatuses and radio network nodes for getting a timing advance.

BACKGROUND OF THE INVENTION

The cellular wireless applications have become more and more diverse and bandwidth-demanding. Thus, there is a constant need for increasing the bandwidth for users. In addition to high bandwidth-demand some applications have also very high requirement for quality of service (QoS). One example of this is video call, wherein the transferred data amount is high and there is a need to keep the video fluent in order to provide pleasant user experience.

Because of this commercial operators have invested to their networks for increasing the capacity. However, the licensed spectrum, supervised by the operators, is a scarce resource of which amount along with the current policy of using the licensed spectrum may not be enough to support huge number of cellular devices and higher QoS requirement traffic in the future. Thus, there is a constant need for finding improvements to the bandwidth and QoS.

One solution to the above mentioned problem is to use unused parts of radio spectrum. One example of unused part of radio spectrum is the white spaces between TV channels.

The TV white space (TVWS) bands are the unused parts of radio spectrum—the TV channels—in the 54-698 MHz range. In the US, for example, the Federal Communications Commission (FCC) has approved the regulated use of the white spaces between and among the unused analog TV channels for unlicensed devices. The potential use of TVWS has been investigated widely in the recent years due to their available large bandwidths at suitable frequencies for different radio applications. In the US, the FCC has regulated licensed or license-exempt TV bands for the secondary-system applications, such as cellular, WiFi and WiMax, on TV Band Devices (TVBD). The highly favorable propagation characteristics of the TV broadcast spectrum, as compared to the 2.4 or 5 GHz bands, allow for wireless broadband deployment with greater range of operation with the ability to pass through buildings, weather, and foliage at lower power levels. Thus, the TV white spaces could be used to provide ubiquitous coverage for municipal wireless networks.

There are multiple available TV channels in the broadcast television frequency bands at 54-60 MHz (TV channel 2), 76-88 MHz (TV channels 5 and 6), 174-216 MHz (TV channels 7-13), 470-608 MHz (TV channels 14-36) and 614-698 MHz (TV channels 38-51), which can be used for TVBD. FCC has defined following requirements for different TV band device types.
1. Fixed Device.
   Operating from fixed location registered to WS database.
   Geo-location/database access required.
   Max 1 W transmission power (4 W radiated power (EIRP)).
   Operating on unoccupied channels between 2 and 51.
   Can't operate on the first adjacent channels to TV stations.
2. Personal/Portable Devices—Modes II/Mode I.
   Can't operate below channel 21.
   Do not need to register to WS database.
   Operating on unoccupied channels between 21 and 51.
   Max 100 mW radiated power (EIRP). (40 mW close to TV station's service area).
   Mode II: Geo-location/database access required.
   Mode I: Geo-location/database access not required.
   A mode II device can accesses to a TV bands database either through a direct connection to the Internet or through an indirect connection to the Internet by way of fixed TVBD or another Mode II TVBD, to obtain a list of available channels.
   A mode II device may select a channel itself and initiate and operate as part of a network of TVBDs, transmitting to and receiving from one or more fixed TVBDs or personal/portable TVBDs.
   A Mode II device must check its location at least once every 60 seconds while in operation
3. Sensing Only Device.
   Use spectrum sensing to determine a list of available channels.
   Max 50 mW radiated power (EIRP). (40 mW close to TV station's service area).
   Operating on unoccupied channels between 21 and 51.

Timing advance is needed in various mobile communication networks for controlling uplink transmissions from a user equipment (UE) to a base station. In the following Long Term Evolution (LTE) networks are used as an example in describing prior art and the problem, however, the same problem may be present also in different network technologies. In LTE networks timing advance is needed so that uplink transmissions from different users arrive at the eNodeB essentially within the cyclic prefix. eNodeB is a radio base station in control of all radio related functions in the fixed part of the LTE system. Such uplink synchronization is needed to avoid interference between the users with uplink transmissions scheduled on the same sub-frame. The timing advance value is measured from Random Access Channel (RACH) transmission when UE does not have a valid timing advance, that is, the uplink for the UE is not synchronized. Timing advance is also needed when LTE user equipments transmit to eNodeB on TVWS due to the large coverage.

In conventional LTE system timing advance is obtained by doing RACH due initial access, RRC connection re-establishment, handover, downlink data arrival or uplink data arrival.

One problem of doing RACH to get riming advance is that one contention-based RACH may collide with another one, which decreases the spectrum efficiency. Furthermore, there are channels which can only be used by portable devices and sensing devices such as channels which are the first adjacent channels to TV stations. In these channels, only user equipment transmissions to eNodeB and to other user equipments are allowed. In other words these are downlink disabled channels. So doing RACH on these downlink disabled channels is impossible.

Thus, there is a need to find a solution to get timing advance on TVWS due to its specific characteristics and regulatory requirements such as on down-link disabled channels.

SUMMARY OF THE INVENTION

The invention discloses a method for obtaining timing advance. Timing control procedure is needed for uplink transmissions in several communication networks. Some networks and bands have physical and regulatory limitations for obtaining timing advance value in conventional manner. One example of these limitations is disabled downlink channel in TV white spaces. The present invention provides an arrangement for obtaining timing advance value in a situation wherein the use of downlink channel is disabled.

The method comprises receiving uplink data at a user equipment for uplink data transmission, requesting the location of a base station from a database, receiving the location of the base station from the database and calculating a timing advance value based on the locations of the user equipment and the base station. After calculating the timing advance in the method uplink data is transmitted using the calculated timing advance.

In an embodiment of the invention a timing advance resolution timer is used. It is determined whether the user equipment receives timing advance command or scheduling signaling from the base station. If the response is not received before the timing advance timer is expired timing advance value is inquired from at least one neighboring user equipment.

In an embodiment of the invention the timing advance value is chosen from the closest neighboring user equipment. Instead of the closest neighboring user equipment the timing advance value may be chosen based on an average of timing advance values of neighboring devices, selecting randomly one received timing advance value, or any other similar suitable method. If timing advance value is not available from neighboring user equipments random access channel transmission may be performed in order to get timing advance value in some other downlink channel.

In an embodiment of the present invention the user equipment is an LTE-device. In a further embodiment of the present invention the LTE-device is a mode II device. In an embodiment of the present invention the user equipment is operating on TV white spaces. In an embodiment of the invention the database is a TV white space database.

In a further embodiment of the invention the method further comprises requesting a timing advance value from a base station as a response for location change. In a further embodiment of the invention the method further comprises sending the timing advance value to neighboring devices as a response for the request from the base station.

In an embodiment the present invention is implemented as an apparatus comprising receiving and sending unit, location determination unit configured to request and receive the location of the base station from a database and processing unit configured to calculate a timing advance value based on the locations of the user equipment and the base station. In an embodiment of the invention receiving and sending unit is configured to transmit uplink data using the calculated timing advance. In an embodiment of the invention the apparatus further comprises a timing advance resolution timer. In an embodiment of the invention the apparatus is configured determine whether the receiving and sending unit receives timing advance command or scheduling signaling from the base station. If the timing advance resolution timer has expired and a timing advance value has not been received, the apparatus is configured to inquire timing advance value from at least one neighboring user equipment. In an embodiment of the invention the apparatus further comprises an inquiring timer. In a further embodiment the apparatus is configured to choose the timing advance value from the closest neighboring user equipment, wherein the choosing comprises receiving information from neighboring devices and calculating the distance between the user equipment and each of the neighboring devices respectively. Instead of the closest neighboring user equipment the timing advance value may be chosen based on an average of timing advance values of neighboring devices, selecting randomly one received timing advance value, or any other similar suitable determination. In an embodiment of the present invention is configured to perform random access channel transmission when the timing advance value is not received from a neighboring user equipment.

In an embodiment of the invention the apparatus is an LTE-device. In a further embodiment the apparatus is a chipset. The chipset is suitable for use in a communications device. In a further embodiment of the invention the apparatus is operating on TV white spaces. In an embodiment of the present invention the database is a TV white space database.

In a further embodiment of the invention the apparatus is further configured to request a timing advance value from a base station as a response for location change. In a further embodiment of the invention the apparatus is further configured to send the timing advance value to neighboring devices as a response for the request from the base station.

In an embodiment of the invention the invention is implemented as a computer program comprising code adapted to cause the method mentioned above. In an embodiment of the invention the computer program is stored on a computer readable medium.

The invention as disclosed above provides a solution to the problem of obtaining timing advance value in downlink disabled channels. In addition to this it reduces the need for random access channel transmission and thus reduces overhead and overall load in the network.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings. It must be understood that even if LTE is used as an example technology in the following example, the solution is applicable to all communication networks having similar problem.

Figure 1A:
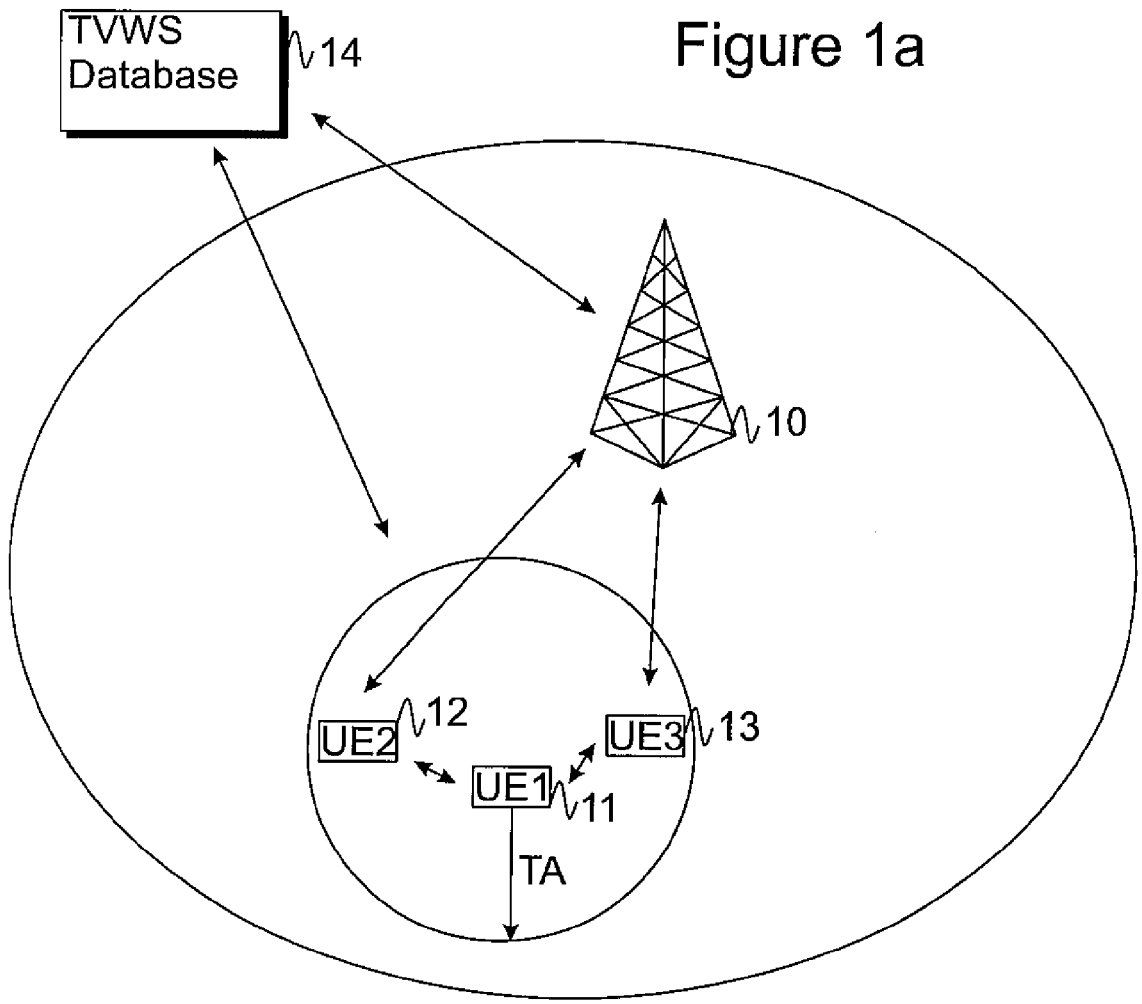
FIG. 1a is a block diagram according to a use scenario of an embodiment of the present invention.

In FIG. 1a is a block diagram according to a use scenario of an embodiment of the present invention. In the figure a base station 10 is communicating with three user equipments 11-13. In the example of FIG. 1a the base station is eNodeB of an LTE network and also a fixed device in TVWS. Each of the user equipment 11-13 are LTE enabled devices that are also Mode II devices in TVWS. These devices can communicate with an external database 14. In this example the database is TVWS database.

Figure 1B:
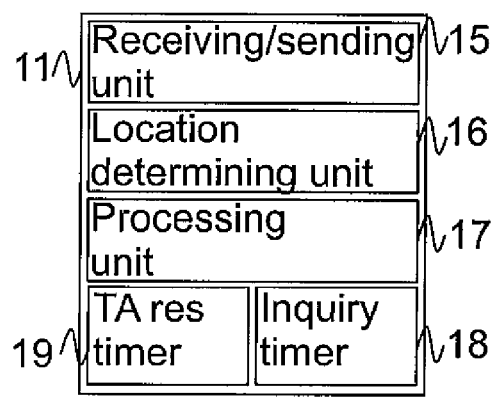
FIG. 1b is a block diagram of a user equipment of FIG. 1a, FIG. 2 is a method according to an embodiment of the present invention.

FIG. 1b discloses a user equipment according to the present invention. In the example of FIG. 1b the user equipment 11 comprises sending and receiving unit 15, location determining unit 16, processing unit 17, inquiry timer 18 and timing advance resolution timer 19. The functionality of these components are explained in the following description, wherein an example of a method according to the present invention is disclosed.

Figure 2:
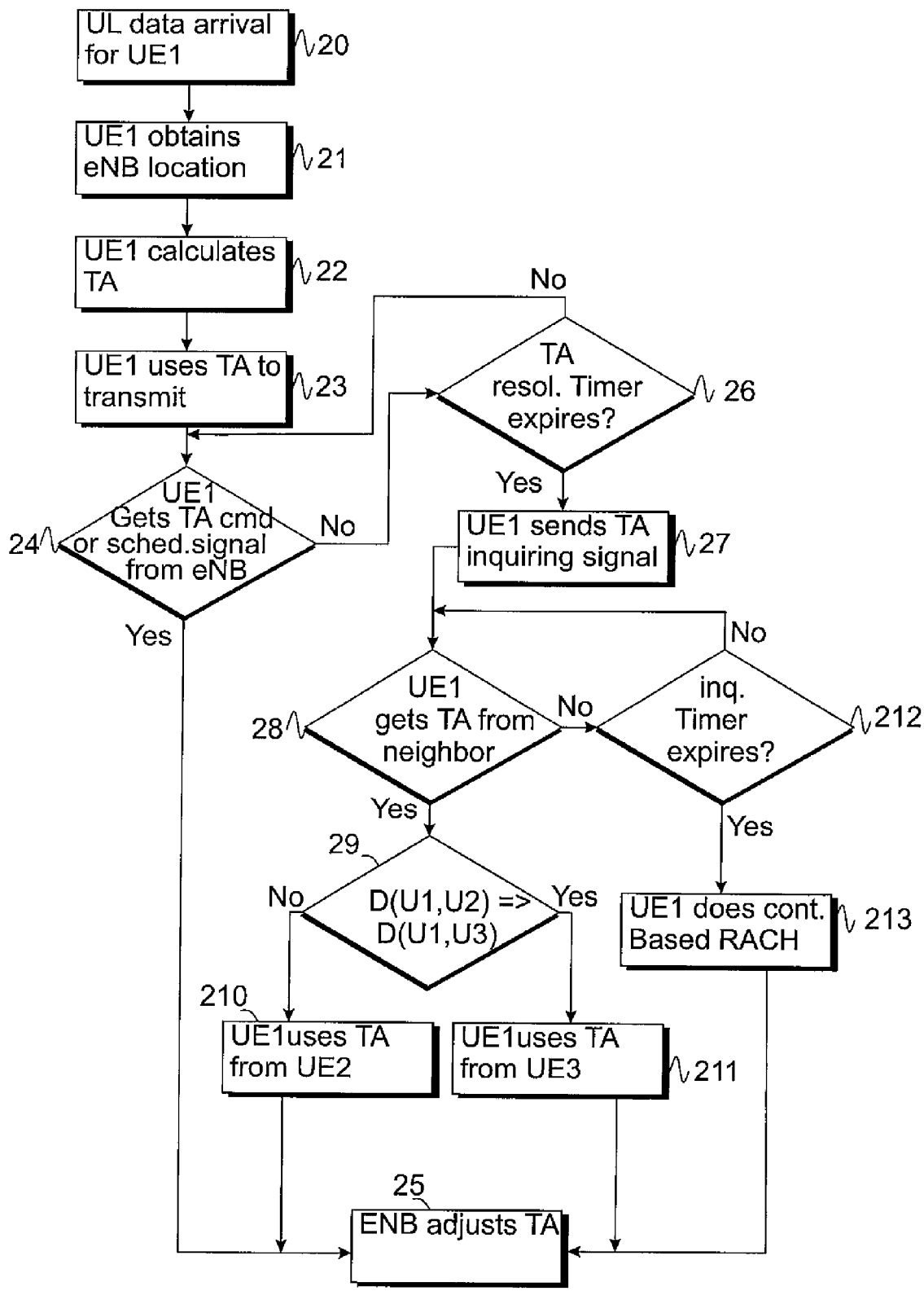

In FIG. 2 a method according to the present invention is disclosed. For the sake of the clarity the method is applied to the exemplary application scenario disclosed in FIG. 1a and 1b. In the method it is assumed that user equipments UE1-UE3 are LTE user equipments in mode II. Fixed device is an LTE eNodeB. User Equipments can get the location of the eNodeB through a TVWS database.

In the example of FIG. 2 there is UL data arrival to the UE1. Thus, UE1 needs to get a timing advance value for the UL transmission, step 20. First UE1 requests eNodeB's location information from TVWS database, step 21. When eNodeB's location is known UE1 can calculate a rough timing advance value for UL transmission based on the own location and eNodeB's location, step 22. The UE1 uses this rough timing advance for UL transmission, step 23. At the same step UE1 sets timing advance resolution timer and the timer starts to decrease. If the timing advance value is not accurate but eNodeB can adjust it by timing advance command, then UE1 will receive timing advance command or scheduling signal within the timing advance resolution timer and it could just continue transmission, step 24. If UE gets timing advance command or scheduling signaling from eNodeB in step 24, then eNodeB adjusts timing advance by timing advance command, step 25. If timing advance is not accurate and is not in the adjustment range, UE1 will not receive TA command and scheduling signaling. Then expiry of the timing advance resolution timer is expected, step 26.

After expiration of the timing advance resolution timer UE1 may send out inquiring signaling to request its neighbor UEs, which are within one timing advance step distance, to share their timing advance values with it. At the same time an inquiring timer is set, step 27. The sent inquiring signaling includes UE1's location information. After receiving UE1's inquiring signaling, its neighbor UEs such as UE2 and UE3 will calculate their distances with UE1 based on their locations. If their distances with UE1 are all beyond one timing advance step distance, they will not send their timing advance values to UE1. If UE2 and UE3 are within one time advance step distance and willing to share their own TA values with UE1, they will send TA feedback signaling to UE1, which includes their timing advance values and their location information. After UE1 receives two timing advance values from UE2 and UE3, it will choose one timing advance value, step 29. In this example, after calculating the distances with UE2 and UE3, UE1 chooses the timing advance value from UE3 which is nearer, step 211. If UE2 was nearer UE1 would have chosen timing advance value from UE2, step 210.

If UE2 or UE3 do not send their timing advance value, or there is no other user equipments available, and inquiring timer expires at step 212, UE1 may do contention-based RACH. In this case, it is possible that UE1 gets the RACH response from a different frequency band/channel on which DL transmissions are allowed, step 213.

In a further embodiment of the present invention the method is performed in advance. In order to get timing advance on time, UE1 can get a timing advance value based on its distance with eNodeB once its location changes for one timing advance step distance. It can also send out inquiring signaling to request timing advance from neighbor UEs within one timing advance step distance. Once eNodeB updates one UE's timing advance value, it can request this UE to voluntarily share its new timing value with its neighbor UEs. Its neighbor UEs within one timing advance step distance can decide to update their timing advance value or not.

The exemplary embodiments can include, for example, any suitable servers, workstations, PCs, laptop computers, personal digital assistants (PDAs), Internet appliances, handheld devices, cellular telephones, smart phones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A method comprising:
   receiving uplink data at a user equipment for uplink data transmission;
   receiving a location of a base station from a database in response to requesting the location of the base station from the database;
   calculating a timing advance value based on a location of the user equipment and the location of the base station;
   transmitting, from the user equipment, the uplink data using the timing advance value calculated and simultaneously starting a timing advance resolution timer;
   determining whether a timing advance command is received at the user equipment in response to the transmission of uplink data before the timing advance resolution timer expires;
   adjusting the timing advance value at the user equipment when the timing advance command is received while the timing advance resolution timer continues to run; and
   requesting a timing advance value of a neighboring user equipment from the neighboring user equipment when the timing advance resolution timer expires before the timing advance command is received.

2. The method according to claim 1, further comprising determining whether the user equipment receives a scheduling signal from the base station.

3. The method according to claim 2, further comprising:
   initializing an inquiry timer at the user equipment when the timing advance value of the neighboring user equipment is requested.

4. The method according to claim 3, wherein the method further comprises:
   receiving a timing advance value and location from at least one neighboring user equipment;
   calculating a distance between the user equipment and each neighboring user equipment; and
   choosing the timing advance value as one of:
      a timing advance value of a closest neighboring user equipment;
      an average of timing advance values received from neighboring user equipments; or
      a timing advance value selected at random from among received timing advance values.

5. An apparatus comprising:
   circuitry configured to
   request and receive a location of a base station from a database;
   calculate a timing advance value based on a location of the apparatus and a location of the base station;
   transmit uplink data using the timing advance value calculated and simultaneously start a timing advance resolution timer;
   determine whether a timing advance command is received in response to the transmission of uplink data before the timing advance resolution timer expires;
   adjust the timing advance value when the timing advance command is received while the timing advance resolution timer continues to run; and
   request a timing advance value of a neighboring user equipment from the neighboring user equipment when the timing advance resolution timer expires before the timing advance command is received.

6. The apparatus according to claim 5, wherein the circuitry is further configured to receive a scheduling signal from the base station.

7. The apparatus according to claim 6, wherein the circuitry is further configured to:
   initialize an inquiry timer when the timing advance value of the neighboring user equipment is requested.

8. The apparatus according to claim 7, wherein the circuitry is further configured to:
   receive a timing advance value and location from at least one neighboring user equipment;
   calculate a distance between the user equipment and each of neighboring user equipment respectively; and
   choose a timing advance value as one of
      a timing advance value of a closest neighboring user equipment;

an average of timing advance values of neighboring user equipments; or a timing advance value selected at random from received timing advance values.

9. The apparatus according to claim 7, wherein the circuitry is further configured to perform random access channel transmission for obtaining a timing advance value when a timing advance value is not received from a neighboring user equipment.

10. The apparatus according to claim 5, wherein the apparatus is an LTE-device.

11. The apparatus according to claim 5, wherein the apparatus is a chipset.

12. The apparatus according to claim 5, wherein the apparatus operates on TV white spaces.

13. The apparatus according to claim 5, wherein the database is a TV white space database.

14. The apparatus according to claim 5, wherein the circuitry is further configured to request a timing advance value from a base station as a response to a location change.

15. The apparatus according to claim 5, wherein the circuitry is further configured to send the timing advance value to a neighboring user equipment as a response to a request from the base station.

16. A non-transitory computer-readable medium encoded with computer-readable instructions that, when executed by processing circuitry, cause the processing circuitry to perform a method comprising:

receiving uplink data at a user equipment for uplink data transmission;

calculating a timing advance value based on a location of the user equipment and a location of the base station received from a database;

transmitting, from the user equipment, the uplink data using the timing advance value calculated and simultaneously starting a timing advance resolution timer;

determining whether a timing advance command is received in response to the transmission of uplink data at the user equipment before the timing advance resolution timer expires;

adjusting the timing advance value at the user equipment when the timing advance command is received while the timing advance resolution timer continues to run; and requesting a timing advance value of a neighboring user equipment from the neighboring user equipment when the timing advance resolution timer expires before the timing advance command is received.

\* \* \* \* \*